Dec. 25, 1956 H. T. LUDGATE 2,775,057
DEVICE FOR JETTISONING SNAGGED FISHHOOKS
Filed Sept. 1, 1954
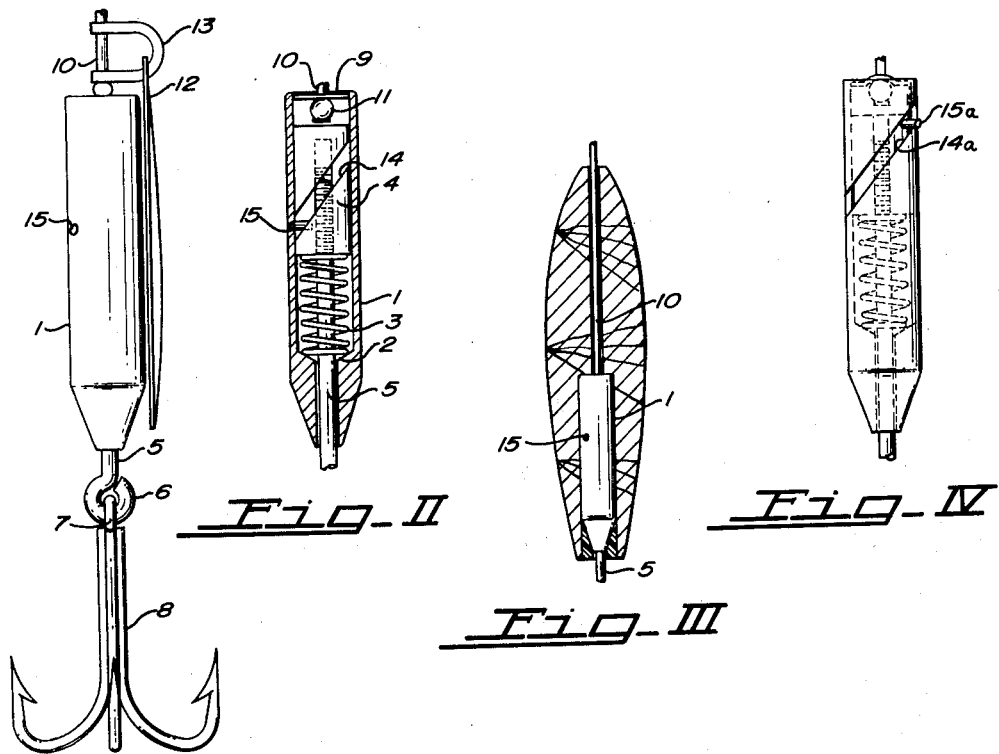
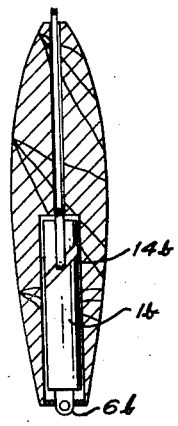
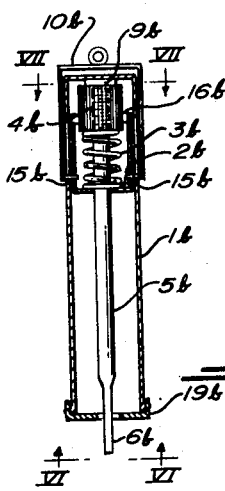
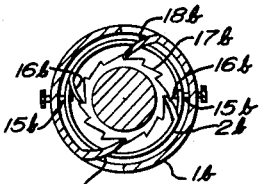
INVENTOR.
HERBERT T. LUDGATE
BY
Marshall, Marshall & Yeasting
ATTORNEYS United States Patent Office 2,775,057
Patented Dec. 25, 1956

2,775,057

DEVICE FOR JETTISONING SNAGGED FISHHOOKS

Herbert T. Ludgate, Toledo, Ohio

Application September 1, 1954, Serial No. 453,598

8 Claims. (Cl. 43—43.12)

The subject of this invention is a device for jettisoning fish hooks that have become caught on logs or other snags and are out of the fisherman's reach. The device does not free the hook from the snag but releases the hook from the line or lure or other tackle element to which the hook is attached.

It is an object of the invention to provide a device to be interposed between the hook and line, the device incorporating mechanism which will prevent the hook from separating from the line unless and until the hook becomes caught in a snag and the line thereafter is subjected to numerous pulls or tugs.

Another object is the provision of a device incorporating a link to one end of which is attached a fish hook the other end being screwed to a member which is so arranged as to be unscrewed from the link by a series of movements.

A further object of the invention is to provide a device incorporating a link one end of which is connected to a fish hook the other end being so connected to the mechanism of the device as to separate therefrom after the mechanism is subjected to a series of impacts.

Still a further object is the provision of a device for jettisoning fish hooks which is of miniature size, which is of simple construction and which may be manufactured at low cost.

A more specific object is the provision of a fish hook jettisoning device which may be mounted within the body of a tackle element such for examples as a lure, a casting plug or a sinker.

Other objects and various advantages will be apparent from the following description illustrated by the accompanying drawings wherein like reference numerals are employed to designate like parts throughout the several views.

In the drawings:

Figure I is an elevational view showing one form of the device of my invention, a fish hook being pivotally attached to one end thereof and a spinner being swivelly attached to the other end thereof.

Figure II is a vertical sectional view through the shell of the device illustrated in Figure I, the interior mechanism being shown in elevation, the fish hook and the spinner and the pivotal and swiveling connections being omitted.

Figure III is a vertical sectional view through a casting plug with a device illustrated in Figures I and II shown in elevation as mounted within the body of the plug.

Figure IV is an elevational view illustrating a modification of a device illustrated in Figures I and II, interior mechanism being shown in dash lines.

Figure V is a vertical sectional view illustrating another modification of the device.

Figure VI is a bottom plan view taken as indicated by the line VI—VI of Figure V.

Figure VII is a vertical sectional view taken as indicated by the line VII—VII of Figure V.

Figure VIII is a view showing the device illustrated in Figures V, VI and VII as being mounted in the body of the casting plug, the plug being shown in section.

Referring now to Figures I, II and III, the mechanism of the device is housed within a shell 1 the larger portion of which is cylindrical and the dimensions of which may be about ⅜ inch in outside diameter by ¾ inch in length.

The shell 1 has a generally cylindrical interior cavity the lower part of which contacts an expansive spring 3 having substantially flat ends with the lower end of the spring resting upon a frusto-conical seat 2 in the lower end of the cavity. Resting upon the upper end of the spring 3 is a nut 4 of generally cylindrical form into which is threaded the upper end of a link 5 which may be made of wire. The lower end of the wire link 5 is shaped into an eye 6 which, with a similar eye 7 on the shank of a fish hook 8, acts as a pivotal connection between the link 5 and the hook 8. The upper end of the shell 1 is closed by a disk 9 having a circular perforation through which a leader 10 of wire or some other suitable material extends for attachment to a line (not shown). Any desired type of fastening, such as for example a bead 11 secured to the end of the leader 10, may be employed to prevent the end of the leader from pulling through the perforation in the disk 9.

In Figure I a spoon-shaped spinner 12 is shown as swivelly mounted on the leader by means of a clevis 13.

A groove 14 is cut or otherwise formed in the nut 4 along a segment of a high pitched spiral, and projecting into the groove 14 is a pin 15 the outer end of which is fixed in the shell 1. The groove and pin constitute a screw connection between the shell and the nut which causes the shell and nut to rotate relative to each other whenever they are moved axially relative to each other.

If the hook 8 catches in a snag a pull or tug on the line attached to the leader 10 will move the shell 1 upwardly along the link 5 and since the nut 4 is threaded upon the link 5 the spring 3 will be compressed between the frusto-conical seat 2 at the lower end of the shell cavity and the end of the nut 4. The pin 15 riding along the lower side of the groove 14 will cause relative rotation between the shell 1 and the nut 4. During this turning movement one or the other ends of the spring 3 can slip upon either a frusto-conical seat 2 or the end of the nut. At the beginning of the stroke the spring 3 is extended and does not press against the conical seat or the end of the nut with sufficient force to create much friction. Resistance of the snagged hook to the pull on the line presses together the threads on the link 5 and in the nut 4 thus clutching the nut to the link.

When the pull or tug on the leader 10 is released the clutching offset is relieved and the spring shoots the frusto-conical seat and the lower end of the nut away from each other. The diameter of the pin 15 is less than the width of the groove 14 hence the pin and the upper side of the groove engage with considerable impact. The nut 4 is lighter than the shell 1 and the mass of the nut lies closely along its axis while the mass of the shell lies remote from its axis. Hence the nut, being unclutched from the link and having less rotational inertia than the shell, responds to the impact of the sloping side of the groove 14 with the pin 15 by rotating about the link 5 and thus partially unscrewing the nut from the link.

It is to be understood that because of the friction of the threads between the nut 4 and the link 5 the nut does not turn about the link when the pin 15 and the lower side of the groove 14 engage without impact, as they do when the fisherman tugs on a stretchable line which is connected to the leader 10. The difference between the rotational inertia of the nut and the rotational inertia of the shell is not effective when the relative rotation of the nut versus the shell is imparted gradually. Friction as well as the direction of inclination of the threads between the nut 4 and the link 5 prevents the nut from turning in a direction that would screw the nut further onto the link when the hook 8 is resisting a pull or tug. But when relative rotation of the nut versus the shell is imparted by impact, as it is when the spring 3 reacts and the pin 15 and the upper side of the groove 14 are snapped together, the greater inertia of the shell retards its rotation so that the nut turns on the link 5 in a direction to unscrew the nut from the link. The pitch of the threads on the wire link is so small and the distance that the link is screwed into the nut is so great that as many as 15 or 20 partial turnings of the nut 4 may be required to unscrew it completely from the link 5.

The form of device illustrated in Figure IV differs from that illustrated in Figures I and II only in that the spiral groove 14a is in the shell and the pin 15a is fixed to and projects from the nut.

In the form of the device illustrated in Figures V, VI, VII and VIII the mechanism is arranged to partially unscrew the nut at each tug on the line regardless of whether the movement is sudden or gradual. The shell 1b encloses a cup 2b within which is mounted an expansive spring 3b the lower end of which engages a seat at the bottom of the cup 2b while the upper end of the spring engages the lower end of a nut 4b. Screwed into the nut 4b is a link 5b having a flattened lower end 6b constituting an eye for the attachment of a hook. The upper end of the shell 1b is closed as at 9b and the nut 4b or a boss thereon, abuts against the closed end. A bail 10b embraces the upper end of the shell 1b and is provided with a pair of pins 15b which project inwardly through spirally extending slots 14b (see Figure VIII) in the shell 1b.

The pins 15b are connected to the cup 2b; hence whenever a line attached to the bail 10b is pulled the cup 2b is moved upwardly compressing the spring 3b. As the cup 2b moves upwardly it rotates relatively to the shell 1b because the pins 15b are guided in the spirally extending slots 14b. Formed upon the upper edge of the cup 2b is a pair of spring pawls 16b which whenever the cup rotates in a direction to unscrew the nut 4b from the link 5b engage ratchet teeth 17b which extend longitudinally along the nut 4b. When the cup 2b rotates in a direction to screw the nut further onto the link the spring pawls 16b "click" over the ratchet teeth, the nut being prevented from turning in a direction further onto the link by spring detents 18b extending inwardly from the shell 1b.

The lower end of the shell 1b is equipped with a snap-on cap 19b having a slot 20b therein which may be slipped over the flattened end 6b of the link 5b after the link has been screwed into the nut. This cap prevents the shell 1b from turning with respect to the link 5b so that movement resulting from the guiding of the pins 15b and the spirally extending slots 14b always turns the nut, rather than the shell, in respect of the link 5b.

As illustrated by Figures III and VIII any form of the device may be mounted within the body of a lure or plug.

When any form of the device is used to connect the hook to a line or a lure the hook if it catches in a log or other snag out of reach of the fisherman may be jettisoned by a series of tugs on the line. The link, which is merely a piece of wire threaded at one end and having an eye at the other end, being left with the hook. It is intended that the device be sold with spare hooks and links which fishermen can readily screw into the nuts to replace those that are jettisoned.

It is to be understood that the forms of my invention described and illustrated above are exemplary only and that the invention is susceptible to variation, modification and change within the spirit and scope of the subjoined claims.

I claim:

1. A snagged fish hook jettisoning device comprising in combination an element adapted to be connected to a fishing line, a fish hook retainer, an intermediate member, there being a high-pitched spiral connection between said element and said member to cause relative rotation upon relative endwise movement of said element and said member, there being a low pitch threaded connection between said intermediate member and said fish hook retainer, means inhibiting turning of said low pitch threaded connection in a direction to screw said fish hook retainer and said member together upon relative endwise movement of said element and said member in one direction, means tending to cause said low pitch threaded connection to turn in a direction to unscrew said fish hook retainer and said member from each other upon relative endwise movement of said element and said member in the opposite direction and a spring which yields to permit relative endwise movement of said element and said member in one direction and reacts to cause relative endwise movement of said element and said member in the opposite direction.

2. A snagged fish hook jettisoning device comprising in combination an element adapted to be connected to a fishing line, a fish hook retainer, an intermediate member having lesser rotational inertia than said element, there being a high-pitched spiral connection between said element and said member to cause relative rotation upon relative endwise movement of said element and said member, there being a low pitch threaded connection between said member and said fish hook retainer, a spring acting between said element and said member, which spring yields when such fishing line is subjected to a strong pull, such yielding permitting relative endwise movement of said element and said member in one direction and when such pull is released reacts against said element and said member to cause relative endwise movement of said element and said member in the other direction, and means whereby the reaction of said spring upon said element and said member results in a sudden functioning of said spiral connection between said element and said member of lesser rotational inertia to turn said member in a direction to unscrew said threaded connection between said member and said fish hook retainer.

3. A snagged fish hook jettisoning device comprising in combination a shell, means for attaching said shell to another article of fishing tackle, a nut located within said shell there being a high-pitched spiral connection between said shell and said nut, a fish hook retainer having an end threaded into said nut with a thread of low pitch, and a spring interposed between said shell and said nut to yield upon a strong pull and thus permit relative movement of said shell and said nut in one direction and to react against said shell and said nut to move said shell and said nut relatively in the opposite direction.

4. A snagged fish hook jettisoning device comprising in combination a shell, means for attaching said shell to another article of fishing tackle, a nut located within said shell there being a high-pitched spiral connection between said shell and said nut, a fish hook retainer having an end threaded into said nut with a thread of low pitch, and a spring interposed between said shell and said nut to yield upon a strong pull and thus permit relative movement of said shell and said nut in one direction and to react against said shell and said nut to move said shell and said nut relatively in the opposite direction, the rotational inertia of said shell being greater than the rotational inertia of said nut.

5. A snagged fish hook jettisoning device comprising in combination a shell, means for attaching said shell to another article of fishing tackle, a nut located within said shell there being a high-pitched spiral connection between said shell and said nut, a fish hook retainer having an end threaded into said nut with a thread of low pitch, and a spring interposed between said shell and said nut to yield upon a strong pull and thus permit relative movement of said shell and said nut in one direction and to react against said shell and said nut to move said shell and said nut relatively in the opposite direction, the rotational inertia of said shell being greater than the rotational inertia of said nut and means whereby the reaction of said spring results in sudden functioning of said spiral connection to rotate said nut in a direction to unscrew it from said fish hook retainer.

6. A snagged fish hook jettisoning device comprising in combination a shell member, means for attaching said shell to another article of fishing tackle, a nut member located within said shell, a connection between said shell and nut members comprising a spirally extending guide on one of said members and a pin fixed to the other of said members loosely received by said guide, a fish hook retainer having an end threaded into said nut, and a spring interposed between said shell and nut members to yield upon relative movement of said members in one direction and to react against said members to move said shell and said nut relatively in the opposite direction.

7. A snagged fish hook jettisoning device comprising in combination an article of fishing tackle, a member mounted within said article, means including a high-pitched spiral connection between said article and said member to cause relative rotation of said article and said member upon relative endwise movement thereof, and a fish hook retainer having an end threaded into said member and a spring interposed between said article and said member and yieldable to permit relative endwise movement thereof in one direction and reacting against said article and said member to cause relative endwise movement thereof in the opposite direction.

8. A snagged fish hook jettisoning device comprising in combination a lure, means for attaching said lure to another article of fishing tackle, a nut located within said lure, a connection between said lure and said nut comprising a spirally extending guide on said lure and a pin fixed to said nut and loosely received in said guide, a fish hook retainer having an end threaded into said nut, and a spring interposed between said lure and said nut to yield upon relative movement of said lure and said nut in one direction and to react against said lure and said nut to move said lure and said nut relatively in the opposite direction.

References Cited in the file of this patent
UNITED STATES PATENTS

| | | |
|---|---|---|
| 1,296,370 | Darling | Mar. 4, 1919 |
| 2,562,054 | Mathieu | July 24, 1951 |